Feb. 8, 1949. W. K. BEETLE, JR 2,461,194
CONTROL UNIT FOR AIRPLANES
Filed Feb. 12, 1945 2 Sheets-Sheet 2
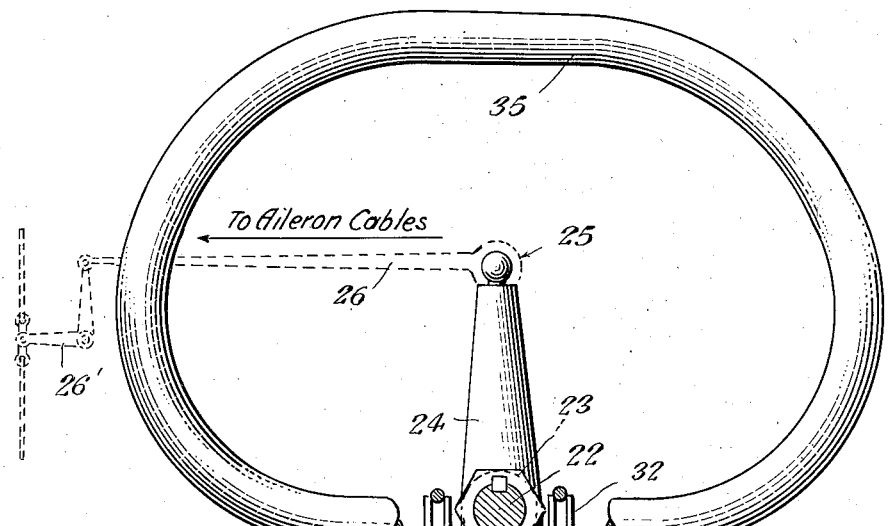
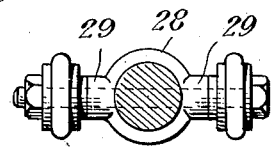
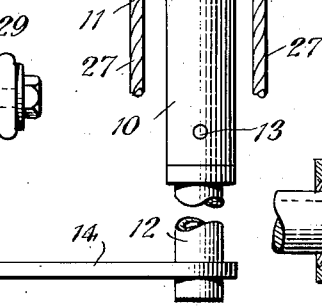
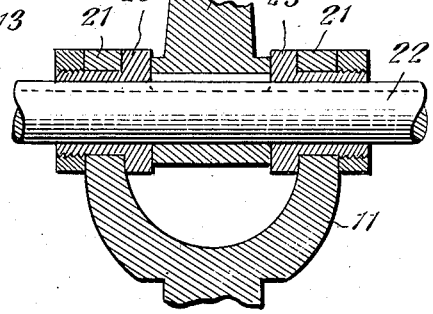
Walter Kurtz Beetle, Jr., INVENTOR
BY
Emery, Varney, Whittemore & Dix, ATTORNEYS Patented Feb. 8, 1949

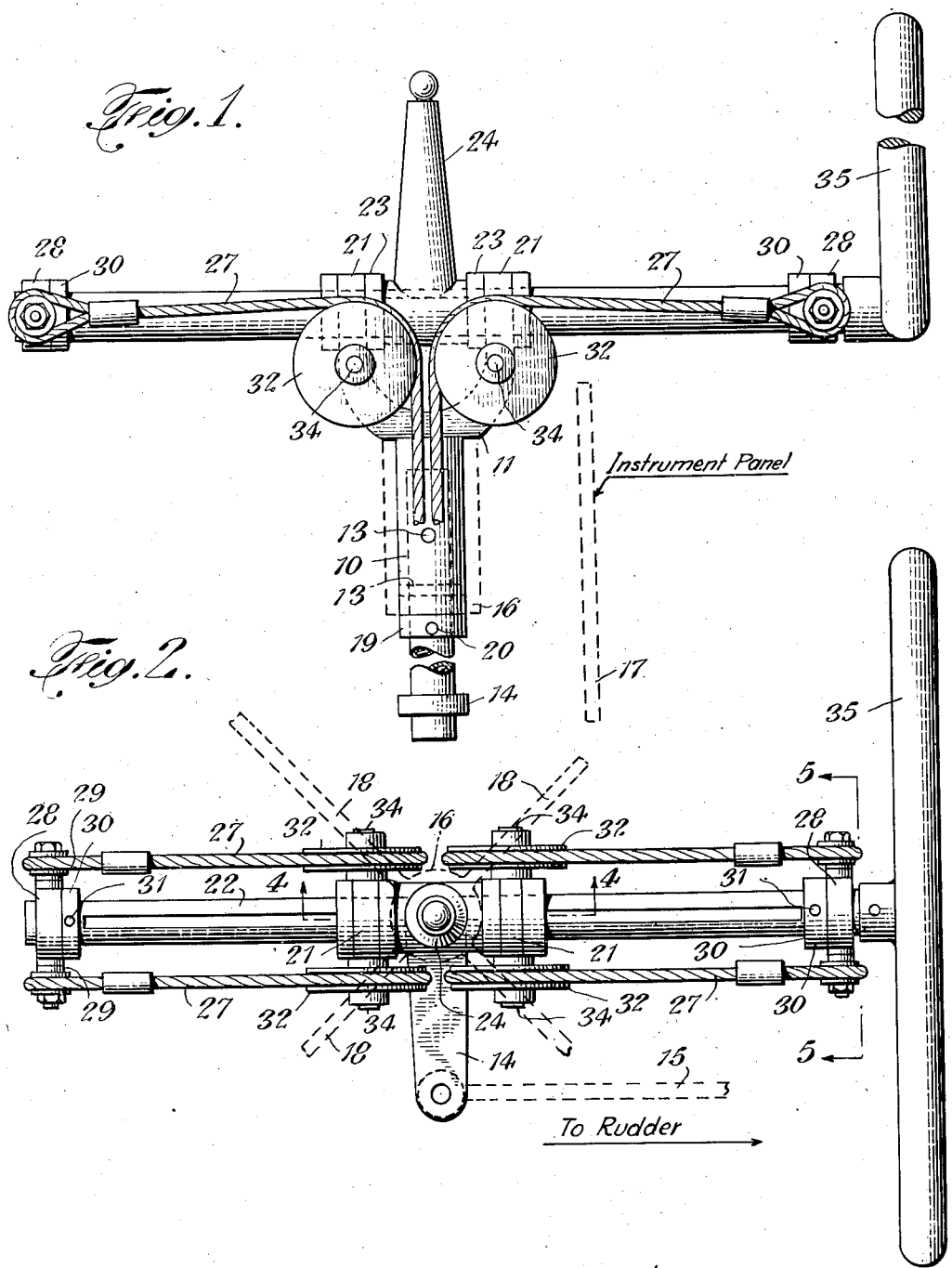

2,461,194

UNITED STATES PATENT OFFICE 2,461,194

CONTROL UNIT FOR AIRPLANES

Walter Kertz Beetle, Jr., Hewlett, N. Y., assignor to Dayton Aircraft Products Sales, Inc., Dayton, Ohio, a corporation of Ohio Application February 12, 1945, Serial No. 577,430

1 Claim. (Cl. 244—83)

My invention relates to improvements in unitary structures for pilot-control of aeroplanes, whereby the elevators, ailerons and rudder (or rudders) are all operated through a single control element, such as a wheel; and its general object is to provide a simple structure for that purpose, comparatively inexpensive to manufacture and install and usable in any aeroplane having the conventional arrangement of cable or rod connections to the elevators, ailerons and rudder (or rudders) respectively. Since it is essential that each of these three controls be capable of being operated independently of the other two, the wheel or other single element through which all three controls are operated simultaneously whenever desired, must be related to the unitary structure as a whole so that any one of the three controls may be operated without causing the slightest operation of the other two. It is with this requisite of unitary control in mind, together with the desirability of providing a simple and inexpensive control unit capable of use with the conventional control cables or rods, that my improved control unit has been devised.

Referring to the drawings:

Figure 1 is a view in side elevation of a control-unit embodying my invention, the dotted lines indicating a supporting socket therefor on the fuselage frame just back of the instrument board.

Figure 2 is a plan view of the unit, the dotted lines indicating the arms which secure the supporting socket rigidly to the upper longerons of the fuslage frame, and the connection to the rudder cables.

Figure 3 is a front view of the unit with the wheel partly broken away, the dotted lines indicating the connection to the aileron cables; and Figures 4 and 5 are detail sectional views taken respectively on planes indicated by the lines 4—4 and 5—5 in Figure 2.

Broadly speaking the unit comprises a substantially vertical shaft the rotation of which controls the operation of the rudder or rudders, and a substantially horizontal shaft mounted on the vertical shaft for both reciprocation as well as rotation to control respectively the operation of the elevators and ailerons.

As shown in Fig. 1 of the drawings, the vertical shaft may consist of a hollow cylindrical member 10 upon the upper end of which is rigidly secured a yoke having a projecting shoulder 11, and upon its lower end a tubular member 12 which fits into the cylindrical member 10 and is rigidly secured thereto by pins 13. Upon the lower end of the tubular member 12, means, such as an arm 14, is secured for connection to the rudder cables through a leader indicated at 15. The unit as a whole is supported for rotation by a bearing-socket member indicated at 16 just forward of the instrument board which is indicated at 17, the vertical shaft being inserted in said socket when installing the unit; and said socket member may be firmly secured to the upper longerons of the fuselage frame (not shown) by arms indicated at 18 (Fig. 2). When the unit is so installed, the shoulder 11 of the yoke abuts against the top of the socket member 16 and a collar 19 having a set-screw 20 may be provided around the cylindrical member 10 just beneath the socket member 16 to cooperate with the shoulder 11 to hold the vertical shaft against longitudinal movement in its supporting socket while permitting it to rotate therein. The principal purpose of the tubular member 12 is to extend the vertical shaft to a point near or beneath the flooring of the aeroplane for connection to the rudder cable 15; but since the rudder cable may be connected nearer the top of the vertical shaft, if desired, the tubular extension 12 is unnecessary and may be dispensed with.

The upper ends of each of the yoke arms 21 are bored to receive the bearings for the horizontal shaft 22. Each of these bearings may consist, as shown in Fig. 4, of a tubular member threaded at one end and provided with a circumferential flange 23 at the other, together with a nut to draw the flange tightly against the corresponding arm of the yoke when the unit is assembled. It will be noted from Fig. 1 that these bearings are to be located one on each side of a plane perpendicular to the horizontal shaft and passing through the axis of the vertical shaft. Between these two bearings an arm 24 is keyed to the horizontal shaft 22 in a position to be swung in the aforesaid plane by the rotation of that shaft, and is held in that position by the flanges 23 of said bearings to keep it from moving along that shaft or shifting its position relative to said plane when that shaft is pushed forward or backward in said bearings to operate the elevators. On the end of the arm 24 may be secured the ball of a ball and socket connection 25 to a link indicated at 26 for connecting said arm to the aileron cables through a bell-crank indicated at 26'.

At each end of the horizontal shaft 22, means are provided for securing thereto the ends of a pair of cables 27 which operate the elevators. Such means may consist of collars 28 provided with lugs 29 to which said cables are secured, the collars being held in a fixed position on the horizontal shaft by clamping rings 30 provided with set-screws 31. These cables pass over pulleys 32 and thence downwardly, the said pulleys being journaled on studs 34 provided on the arms 21 of the yoke and preferably being of such size and so positioned on said arms that the aforesaid plane perpendicular to the horizontal shaft and passing through the axis of the vertical shaft will be approximately tangent to the peripheries of the pulleys.

A control wheel 35 for manual operation by the pilot is rigidly secured to the rear end of the horizontal shaft, said wheel preferably consisting of an elliptically-shaped ring, as shown, and being connected to the horizontal shaft so that its longer axis lies in a horizontal plane above that shaft where it may be conveniently grasped and held by the pilot.

It will thus be seen that the horizontal shaft is capable of three distinct movements each independent of the other two, to wit, one, a swinging movement in a horizontal plane on the axis of the vertical shaft and which causes the vertical shaft to rotate, another, a rotary movement about its own axis, and a third, a linear movement along its own axis; and notwithstanding that the pilot may operate each of the three controls simultaneously through the wheel, he may also operate each control independently of the others. If the pilot desires, for example, to operate the rudders independently of the ailerons and the elevators, he moves the wheel to swing the horizontal shaft around the axis of the vertical shaft but without rotating it in its own bearings or moving it backward or forward through them; and since the guide pulleys around which the elevator cables pass have their peripheries tangent to a plane perpendicular to the horizontal shaft and passing through the axis of the vertical shaft, the mere swinging of the horizontal shaft around the axis of the vertical shaft for a rudder operation will not have the slightest effect upon the elevators. Moreover, since the arm 24 always remains in that same plane, the swinging of the horizontal shaft around the axis of the vertical shaft for a rudder operation will not have the slightest effect upon the ailerons. If, now, the pilot desires to operate the ailerons independently of the other two controls, he turns the wheel to rotate the horizontal shaft in its bearings but does not push or pull the wheel to move the horizontal shaft forward or backward through its bearings or move the wheel to swing the horizontal shaft around the axis of the vertical shaft; and hence in that case there will be no movement of the cables 27 controlling the elevators and no movement of the arm 14 controlling the rudder, so that there can be no effect whatever on the elevators or rudder. If, finally, the pilot wishes to operate the elevators independently of the other controls, he pushes or pulls the wheel to slide the horizontal shaft forward or backward through its bearings but without rotating it in its bearings or turning it around the axis of the vertical shaft; and hence this can produce no effect whatever upon the ailerons or rudder since their respective control arms 24 and 14 will remain stationary.

Moreover, it is apparent that the installation of my unit in an aeroplane having the conventional cable or rod controls is readily accomplished; for all one has to do is to provide a firm supporting socket in the space just forward of the instrument board to receive the vertical shaft of the unit, insert the vertical shaft therein, turn the set-screw in the locking collar 18, connect the elevator cables of the unit to the elevator cables of the aeroplane, and connect the arms 14 and 24 to the rudder and aileron cables of the aeroplane respectively.

I claim as my invention:

A manually operated unit for combination with the elevators, ailerons and rudder of an aeroplane whereby these three manoeuvering controls may be operated through a single handle, said unit comprising: a vertical shaft for rotation about its longitudinal axis, a horizontal shaft whose longitudinal axis is perpendicular to the axis of said vertical shaft and having an operating handle secured thereto, bearings for said horizontal shaft carried by the upper end of said vertical shaft and in which said horizontal shaft is both slidable and rotatable, a cable for operating the elevators having its ends secured respectively to the ends of said horizontal shaft, an arm swingable in a plane which is perpendicular to the axis of said horizontal shaft and passes through the axis of said vertical shaft, one end of said arm being keyed to said horizontal shaft, connections secured to the other end of said arm for operating the ailerons, and an arm secured to said vertical shaft for operating the rudder; the said unit being characterized by the following: a pair of pulleys carried by the upper end of said vertical shaft each of which is mounted to rotate in a plane closely adjacent to said horizontal shaft and parallel to the axes of both said vertical and horizontal shafts, the effective radius of each said pulley being slightly less than the distance between its own axis and the axis of said vertical shaft, the said cable for operating the elevators extending parallel to and along said horizontal shaft from each end thereof to the respective pulleys aforesaid and thence over said pulleys and vertically down so as to lie close to and parallel with said vertical shaft, the first named arm aforesaid, when in its neutral position, having its longitudinal axis coincident with that of said vertical shaft, and the said connections for operating the ailerons extending laterally from that said arm.

WALTER KERTZ BEETLE, Jr.

REFERENCES CITED

The following references are of record in the file of this patent:

UNITED STATES PATENTS

| Number | Name | Date |
|---|---|---|
| 1,025,482 | Reid | May 7, 1912 |
| 1,714,170 | Jette | May 21, 1929 |
| 1,900,068 | Mueller | Mar. 7, 1933 |

FOREIGN PATENTS

| Number | Country | Date |
|---|---|---|
| 267,301 | Germany | Nov. 15, 1913 |